Figure 1:
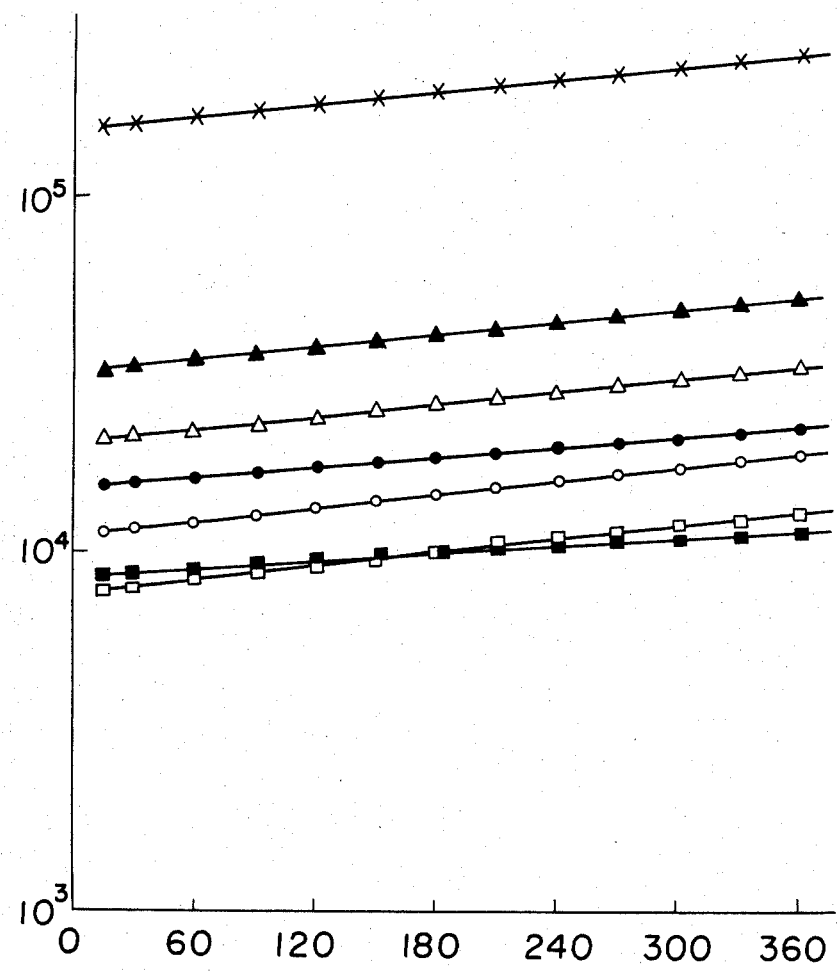

United States Patent

Itabashi et al.

[11] Patent Number: 4,652,597
[45] Date of Patent: Mar. 24, 1987

[54] EPOXY RESIN COMPOSITION

[75] Inventors: Yoshifumi Itabashi, Takarazuka; Toshiharu Ando, Itami; Kazuo Yasuda, Kawanishi; Masaru Tsuchihashi, Sanda, all of Japan

[73] Assignee: Mitsubishi Denki Kabushiki Kaisha, Tokyo, Japan

[21] Appl. No.: 785,402

[22] Filed: Oct. 8, 1985

[30] Foreign Application Priority Data

Feb. 12, 1985 [JP] Japan .................................. 60-25425

[51] Int. Cl.⁴ ........................... C08K 3/40; C08K 3/22
[52] U.S. Cl. .................................... 523/457; 523/444; 528/104
[58] Field of Search ................. 528/87, 110, 104, 100, 528/112, 115; 523/444, 457

[56] References Cited

U.S. PATENT DOCUMENTS

| | | | |
|---|---|---|---|
| 2,908,664 | 10/1959 | Belanger et al. | 528/104 |
| 3,284,407 | 11/1966 | Winfield et al. | 528/112 |
| 3,477,990 | 11/1969 | Dante et al. | 528/112 |
| 3,563,939 | 2/1971 | Stevens et al. | 523/457 |
| 4,132,706 | 1/1979 | Doorakian et al. | 528/112 |
| 4,546,155 | 10/1985 | Hirose et al. | 528/100 |

FOREIGN PATENT DOCUMENTS 5331904 6/1970 Japan .

*Primary Examiner*—Veronica P. Hoke
*Attorney, Agent, or Firm*—Oblon, Fisher, Spivak, McClelland & Maier

[57] ABSTRACT

An epoxy resin composition which comprises:
(a) an epoxy resin having an epoxy equivalent of at most 200;
(b) a condensation mixture of 1 mol of a polybasic carboxylic acid anhydride, from 0.07 to 0.3 mol of a bisphenol A having the formula:

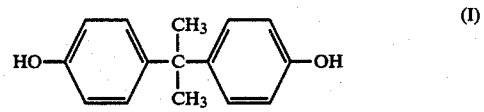

and from 0.07 to 0.3 mol of a monohydric phenol having the formula:

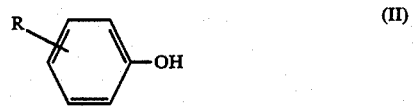

wherein R is an alkyl group, as a curing agent; and
(c) an inorganic powder, as a filler.

7 Claims, 1 Drawing Figure

EPOXY RESIN COMPOSITION

The present invention relates to an epoxy resin composition for cast insulators to be used for electrical equipments.

Cured products of epoxy resins and acid anhydrides have excellent electrical characteristics and mechanical and chemical properties, and thus they are widely used as epoxy resin cast insulators for electrical equipments or power transmission and distribution equipments. For the production of such epoxy resin cast articles, there is a so-called pressure gelation method as a method for shortening the mold release time in order to improve the productivity by means of a small number of casting molds. According to this method, a mixture of the resin composition is maintained in a low temperature pressure tank, and at the time of casting, it is injected, through a pipeline and a casting head directly into mold having a temperature higher than the resin mixture, while maintaining the pressure to complement the cure shrinkage of the resin, whereby the curing will be completed in a short period of time to obtain a final product. The epoxy resin mixture to be used in this method, is required to have a low viscosity in the low temperature pressure tank, a long useful life, and a property so that it can quickly be cured in the high temperature mold.

As a general characteristic of epoxy resins, those having a low viscosity at a low temperature have a low molecular weight and thus have an extremely large cure shrinkage factor, whereby the cured product is likely to have defects such as sink marks or cracks. On the other hand, those having a high reaction rate at a high temperature are usually reactive also at a low temperature, whereby the useful life tends to be short. With respect to these problems, it is common to employ a pressure gelation method to avoid the sink marks or cracks which are likely to form during the curing process, or to employ a latent accelerator to prolong the useful life. However, an epoxy resin having a low molecular weight and a low viscosity at a low temperature, is usually inferior in the thermal shock resistance to a solid or highly viscous epoxy resin which is commonly employed in an ordinary casting method other than the pressure gelation method.

Heretofore, as a method for improving the thermal shock resistance of an epoxy resin having a low viscosity, it has been proposed to incorporate a flexibilizer such as a high molecular weight oligomer having a molecular weight of from 500 to 5000 with its main chain made of a polyester, a polyether, a polybutadiene or the like. However, such a method has a drawback such that with an increase of the amount of the flexibilizer, the viscosity increases remarkably, and the heat resistance decreases substantially. On the other hand, if the amount is small, no substantial improvement of the thermal shock resistance is obtainable. A flexibilizer which does not substantially increase the viscosity of the resin mixture, such as the one with its main chain made of a polyamide, has a drawback such that it has a high reactivity, whereby the useful life of the resin mixture tends to be short.

It is an object of the present invention to overcome the conventional drawback that either the heat resistance or the thermal shock resistance of the low viscosity epoxy resin is sacrificed, and to provide an epoxy resin composition having excellent thermal shock resistance without impairing the heat resistance and the properties essential for the pressure gelation method i.e. a low viscosity at a low temperature, a long useful life and a quick curing property at a high temperature.

The present invention provides an epoxy resin composition which comprises:

(a) an epoxy resin having an epoxy equivalent of at most 200;

(b) a condensation mixture of 1 mol of a polybasic carboxylic acid anhydride, from 0.07 to 0.3 mol of a bisphenol A having the formula:

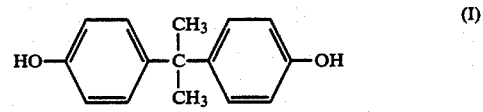

and from 0.07 to 0.3 mol of a monohydric phenol having the formula:

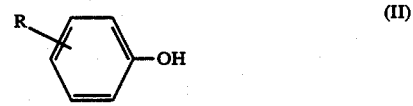

wherein R is an alkyl group, as a curing agent; and (c) an inorganic powder, as a filler.

Now, the present invention will be described in detail with reference to the preferred embodiments.

In the accompanying drawing, FIG. 1 is a graph showing the changes with time of the viscosities at 60° C. of the epoxy resin compositions prepared by Examples 1 to 4 and by Comparative Examples 1 to 3.

As the epoxy resin (a) having an epoxy equivalent of at most 200 to be used in the present invention, there may be employed any epoxy resin which is liquid at a low temperature (i.e. from 20° to 80° C.) or which, when mixed with a curing agent i.e. the condensation mixture (b), is liquid at a low temperature. For example, the following epoxy resins may be employed alone or in combination as a mixture of two or more different kinds. Namely, there may be mentioned a bisphenol A-type epoxy resin, a bisphenol F-type epoxy resin, a phenol novolak-type epoxy resin, a cresol novolak-type epoxy resin, an cycloaliphatic diglycidyl ester-type epoxy resin, a cycloaliphatic epoxy resin containing an epoxy group in the ring, an epoxy resin containing a spiro-ring, and a hydantoin epoxy resin.

The condensation mixture (b) to be used in the present invention, is prepared by mixing the polybasic carboxylic acid anhydride, the bisphenol A of the formula I and the monohydric phenol of the formula II at a temperature of from 100° to 150° C. in a nitrogen atmosphere until a uniform liquid is obtained. In this preparation, an accelerator such as a metal salt of an organic carboxylic acid or a tertiary amine, may be optionally added. As the polybasic carboxylic acid anhydride to be used for the preparation of the condensation mixture (b), there may be employed any polybasic carboxylic acid anhydride so long as it is liquid at a low temperature (i.e. from 20° to 80° C.). For example, there may be mentioned hexahydrophthalic anhydride, methylhexahydrophthalic anhydride, tetrahydrophthalic anhydride and methyltetrahydrophthalic anhydride. These anhydrides may be used alone or in combination as a mixture of two or more different kinds.

As the monohydric phenol, there may be mentioned, for example, cresol and tert-butylphenol. These phenols may be used alone or in combination as a mixture of two or more different kinds.

In the condensation mixture (b), if the amount of the bisphenol A of the formula I is less than 0.07 mol relative to 1 mol of the polybasic carboxylic acid anhydride, and if the amount of the monohydric phenol of the formula II is less than 0.07 mol, it becomes difficult to improve the thermal shock resistance of the cured product. On the other hand, if the amount of the bisphenol A exceeds 0.3 mol, and if the amount of the monohydric phenol exceeds 0.3 mol, the viscosity of the mixture of the epoxy resin and the inorganic powder filler at a low temperature exceeds 100,000 cp (centipoise), whereby the injection through the pipeline will be difficult, and the resin mixture can not be used as a resin mixture for the pressure gelation casting method.

As the inorganic powder (c) to be used as the filler in the present invention, there may be employed any inorganic powder so long as it does not impair the electrical and mechanical properties. For example, there may be mentioned alumina powder, hydrated alumina powder, quartz powder or fused quartz powder. However, the inorganic powder is not restricted to these specific examples.

The epoxy resin composition of the present invention preferably comprises 100 parts by weight of the epoxy resin (a), from 50 to 150 parts by weight of the condensation mixture (b) and from 200 to 600 parts by weight of the inorganic powder (c).

The process for producing a cast product from the epoxy resin composition of the present invention may comprise mixing the epoxy resin (a) having an epoxy equivalent of at most 200 with the condensation mixture (b) and the inorganic powder (c) optionally together with an accelerator, at a temperature of from 20° to 80° C., preferably under a vacuumed condition, and injecting the epoxy resin composition thereby obtained, through a pipeline, directly into a mold preheated at a temperature of from 90° to 160° C., followed by curing for from 1 to 30 minutes while maintaining the pressure at a gauge pressure level of from 0.5 to 5.0 kg/cm$^2$, whereby a cured product will be obtained.

As the accelerator which may be added to the epoxy resin composition, there may be employed a metal salt of an organic carboxylic acid such as zinc octylate, a tertiary amine, a boron trifluoride-amine complex or an imidazole. However, the accelerator is not restricted to these specific examples. The amount of the accelerator is adjusted so that the curing can be completed in from 1 to 30 minutes at a mold temperature of from 90° to 160° C., and the accelerator is incorporated preferably in an amount of from 0.8 to 8 parts by weight.

Further, other additives such as a coloring agent, a coupling agent and an internal release agent may be incorporated to the epoxy resin composition of the present invention so long as they do not impair the viscosity, the long useful life and the quick curing property of the resin composition and the desired properties of the cured product such as the high HDT (heat deformation temperature) and the high thermal shock resistance.

Now, the present invention will be described in further detail with reference to Examples and Comparative Examples. However, it should be understood that the present invention is by no means restricted to these specific Examples.

EXAMPLE 1

100 parts by weight of an epoxy resin GY-260 (tradename) manufactured by Ciba-Geigy Corp., 70 parts by weight of a condensation mixture obtained by mixing 10 parts by weight of bisphenol A and 27 parts by weight of p-tert-butylphenol to 100 parts by weight of methyl-THPA (acid anhydride), 1 part by weight of zinc octylate and 440 parts by weight of alumina powder, were stirred at 60° C. under reduced pressure to obtain an epoxy resin composition. The initial viscosity, useful life, gelation time and viscosity change with time, of the composition thus obtained, were measured by the methods identified below. The results are shown in Table 1 and FIG. 1 (identified by O in FIG. 1).

Further, test pieces for the crack resistance test and the HDT test, were prepared by using the above composition. (The composition was geled at 150° C., followed by curing at 130° C. for 24 hours.) The test pieces were evaluated in accordance with the methods identified below. The results are shown in Table 1.

Initial viscosity

After the preparation of the epoxy resin composition, the composition was stirred at 60° C. under reduced pressure for 15 minutes, whereupon the viscosity was measured.

Useful life

After the preparation of the epoxy resin composition, the viscosity was measured at 60° C. every 30 minutes, and the time until the viscosity reached 50,000 cp was determined.

Gelation time

The epoxy resin composition was heated in a hot air dryer at 150° C., and the time until the composition was geled, was measured.

Viscosity change with time

The epoxy resin composition was put in a container at 60° C., and held in an oil bath at 60° C. The viscosity was measured every 30 minutes, whereby the change of the viscosity with time was examined.

Crack index

Test pieces for the crack resistance test were prepared from the epoxy resin composition and tested in accordance with the method recommended by IEC (publication 455-2).

Deflection temperature under flexural load (HDT)

Test pieces were prepared and tested in accordance with ASTM-D648.

EXAMPLE 2

100 parts by weight of an epoxy resin GY-260, 75 parts by weight of a condensation mixture obtained by mixing 25 parts by weight of bisphenol A and 17 parts by weight of p-tert-butylphenol to 100 parts by weight of methyl-THPA, 1 part by weight of zinc octylate and 450 parts by weight of alumina powder, were stirred at 60° C. under reduced pressure to obtain an epoxy resin composition. The properties of the composition thus obtained and the properties of the cured product were measured in the same manners as in Example 1. The results are shown in Table 1 and FIG. 1 (identified by ● in FIG. 1).

EXAMPLE 3

100 parts by weight of an epoxy resin GY-260, 75 parts by weight of a condensation mixture obtained by mixing 40 parts by weight of bisphenol A and 7 parts by weight of p-tert-butylphenol to 100 parts by weight of methyl-THPA, 1 part by weight of zinc octylate and 450 parts by weight of alumina powder, were stirred at 60° C. under reduced pressure to obtain an epoxy resin composition. The properties of the composition thus obtained and the properties of the cured product were measured in the same manners as in Example 1. The results are shown in Table 1 and FIG. 1 (identified by ∆ in FIG. 1).

EXAMPLE 4

100 parts by weight of an epoxy resin GY-260, 75 parts by weight of a condensation mixture obtained by mixing 40 parts by weight of bisphenol A and 27 parts by weight of p-tert-butylphenol to 100 parts by weight of methyl-THPA, 1 part by weight of zinc octylate and 450 parts by weight of alumina powder, were stirred at 60° C. under reduced pressure to obtain an epoxy resin composition. The properties of the composition thus obtained and the properties of the cured product were measured in the same manners as in Example 1. The results are shown in Table 1 and FIG. 1 (identified by ▲ in FIG. 1).

COMPARATIVE EXAMPLE 1

100 parts by weight of an epoxy resin GY-260, 70 parts by weight of methyl-THPA, 1 part by weight of zinc octylate and 440 parts by weight of alumina powder, were stirred at 60° C. under reduced pressure to obtain an epoxy resin composition. The properties of the composition thereby obtained and the properties of the cured product were measured in the same manners as in Example 1. The results are shown in Table 1 and FIG. 1 (identified by □ in FIG. 1).

COMPARATIVE EXAMPLE 2

100 parts by weight of an epoxy resin GY-260, 70 parts by weight of a condensation mixture obtained by mixing 5 parts by weight of bisphenol A and 5 parts by weight of p-tert-butylphenol to 100 parts by weight of methyl-THPA, 1 part by weight of zinc octylate and 440 parts by weight of alumina powder, were stirred at 60° C. under reduced pressure to obtain an epoxy resin composition. The properties of the composition thus obtained and the properties of the cured product were measured in the same manners as in Example 1. The results are shown in Table 1 and FIG. 1 (identified by ■ in FIG. 1).

COMPARATIVE EXAMPLE 3

100 parts by weight of an epoxy resin GY-260, 75 parts by weight of a condensation mixture obtained by mixing 50 parts by weight of bisphenol A and 40 parts by weight of p-tert-butylphenol to 100 parts by weight of methyl-THPA, 1 part by weight of zinc octylate and 450 parts by weight of alumina powder, were stirred at 60° C. under reduced pressure to obtain an epoxy resin composition. The properties of the composition thus obtained and the properties of the cured product were measured in the same manners as in Example 1. The results are shown in Table 1 and FIG. 1 (identified by X in FIG. 1).

In the above Examples and Comparative Examples, the filler and the curing agent were incorporated so that the filler concentration relative to the epoxy resin composition was about 72% by weight, and the equivalent ratio of the curing agent to the epoxy resin was 0.8.

TABLE 1

| Examples | Properties of compositions | | | Properties of cured products | |
|---|---|---|---|---|---|
| | Initial viscosity (CP) | Useful life (min) | Gelation time (min) | Deflection temperature under flexural load (°C.) | Crack index (cycle) |
| 1 | 11000 | at least 360 | 18 | 108 | 5.8 |
| 2 | 13800 | at least 360 | 22 | 109 | 6.0 |
| 3 | 21600 | at least 360 | 25 | 108 | 6.4 |
| 4 | 37000 | 280 | 24 | 107 | 7.2 |
| Comparative Example 1 | 8400 | at least 360 | 16 | 110 | 1.4 |
| Comparative Example 2 | 9000 | at least 360 | 23 | 109 | 1.2 |
| Comparative Example 3 | 132000 | at least 360 | 20 | 104 | 7.0 |

The epoxy resin compositions of the present invention are capable of producing cast insulators having excellent properties with respect to both the high HDT and the thermal shock resistance, and further contribute to the productivity and the stability of the product quality. Further, it is thereby possible to reduce the loss of the resin in the production line, and thus contribute to the saving of resources.

We claim:
1. An epoxy resin composition which comprises:
   (a) 100 parts by weight of an epoxy resin having an epoxy equivalent of at most 200;
   (b) from 50 to 150 parts by weight of a mixture of 1 mole of a polybasic carboxylic acid anhydride, from 0.07–0.3 moles of a bisphenol A having the formula:

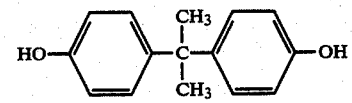

and from 0.07–0.3 moles of a monohydric phenol having the formula:

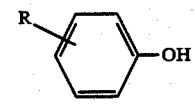

wherein R is a lower alkyl group, as a curing agent; and
   (c) from 200 to 600 parts by weight of an inorganic powder; and wherein each of said epoxy resin and said polybasic carboxylic anhydride is liquid at from 20° to 80° C.

2. The epoxy resin composition according to claim 1, which after curing exhibits a crack index of from 5.8–7.2.

3. The epoxy resin composition according to claim 1, wherein the monohydric phenol is cresol or tert-butylphenol.

4. The epoxy resin composition according to claim 1, wherein the expoy resin (a) is selected from the group consisting of a bisphenol A epoxy resin, a bisphenol F epoxy resin, a phenol novolak epoxy resin, a cresol novolak epoxy resin, a cycloaliphatic diglycidyl ester epoxy resin, a cycloaliphatic epoxy resin containing an epoxy group in the ring, an epoxy resin containing a spiro-ring, and hydantoin epoxy resin.

5. The epoxy resin composition according to claim 1, wherein the condensation mixture (b) is prepared by mixing the polybasic carboxylic acid anhydride, the bisphenol A of the formula I and the monohydric phenol of the formula II at a temperature of from 100° to 150° C. in a nitrogen atmosphere until a uniform liquid is obtained.

6. The epoxy resin composition according to claim 1, wherein the polybasic carboxylic acid anhydride is selected from the group consisting of hexahydrophthalic anhydride, methylhexahydrophthalic anhydride, tetrahydrophthalic anhydride and methyltetrahydrophthalic anhydride.

7. The epoxy resin composition according to claim 1, wherein the inorganic powder (c) is selected from the group consisting of alumina powder, hydrated alumina powder, quartz powder or fused quartz powder.

* * * * *